United States Patent [19]

Hofmann

[11] Patent Number: 5,522,480
[45] Date of Patent: Jun. 4, 1996

[54] MEASUREMENT PICK-UP TO DETECT PHYSICAL CHARACTERISTICS OF A LIFT FOR PEOPLE OR FREIGHT

[75] Inventor: Hans P. Hofmann, Vaterstetten, Germany

[73] Assignee: Technischer Überwachungsverei Bayern Sachsen e.V., Münich, Germany

[21] Appl. No.: 515,691
[22] Filed: Aug. 16, 1995

Related U.S. Application Data

[63] Continuation of Ser. No. 50,343, filed as PCT/EP91/02131, Nov. 11, 1991 published as WO92/08665, May 29, 1992, abandoned.

[30] Foreign Application Priority Data

Nov. 12, 1990 [DE] Germany ............................ 9015495 U

[51] Int. Cl.$^6$ ................................ B66B 1/32; B66B 3/00; B66B 5/16
[52] U.S. Cl. ........................... 187/391; 187/288; 187/393
[58] Field of Search ..................... 187/391, 393, 187/288, 277

[56] References Cited

U.S. PATENT DOCUMENTS

| 4,401,192 | 8/1983 | Trosky et al. | 187/29 |
| 4,418,795 | 12/1983 | Trosky et al. | 187/9 R |
| 4,512,442 | 4/1985 | Moore et al. | 187/29 R |
| 4,561,093 | 12/1985 | Doane et al. | 371/20 |
| 4,750,590 | 6/1988 | Otala | 187/95 |
| 4,750,591 | 6/1988 | Coste et al. | 187/130 |
| 4,874,063 | 10/1989 | Taylor | 187/130 |
| 4,880,082 | 11/1989 | Kähkipuro et al. | 187/134 |
| 5,400,872 | 3/1995 | Skalski et al. | 187/393 |
| 5,402,863 | 4/1995 | Okumura et al. | 187/288 |

FOREIGN PATENT DOCUMENTS

| 0390972A1 | 10/1990 | European Pat. Off. | B66B 5/00 |
| 0390972 | 10/1990 | European Pat. Off. | |
| 2615842 | 12/1988 | France . | |
| 2025663 | 1/1980 | United Kingdom . | |
| 2201656A | 1/1987 | United Kingdom | B66B 1/40 |
| 2201656 | 7/1988 | United Kingdom . | |
| 2025663A | 9/1988 | United Kingdom | B66B 5/00 |

Primary Examiner—Peter S. Wong
Assistant Examiner—Robert Nappi
Attorney, Agent, or Firm—Seed and Berry

[57] ABSTRACT

A portable transducer for detecting physical parameters during testing of an elevator's emergency stop device. In particular, acceleration and time values of a passenger and/or freight elevator are obtained. The transducer comprises a sensor, a timer associated to the sensor, and memory. The transducer can be connected to an evaluation unit to download data after the test is complete. The transducer is easy to handle and can have various test applications independent of the special conditions of the elevator, the transducer is transportable, can be removed from the elevator car, and contains a trigger component to initiate measurement and storage of data into the buffer memory.

7 Claims, 3 Drawing Sheets

MEASUREMENT PICK-UP TO DETECT PHYSICAL CHARACTERISTICS OF A LIFT FOR PEOPLE OR FREIGHT

CROSS-REFERENCE TO RELATED APPLICATION

This application is a file wrapper continuation of U.S. patent application Ser. No. 08/050,343, filed Jun. 14, 1993, now abandoned.

TECHNICAL FIELD

The present invention relates to a transducer with integrated buffer memory for detecting physical parameters, especially the acceleration value, of a passenger and/or freight elevator for purposes of testing the emergency stop devices. The invention utilizes a transducer containing a memory module, a sensor, a timer and integrated buffer memory associated thereto wherein the memory module is connectable via an interface component to an evaluation unit which analyzes data downloaded from the integrated buffer memory after testing is completed.

BACKGROUND OF THE INVENTION

The detection of physical parameters, such as the acceleration, is necessary for the regular control of passenger and freight elevators. In a known transducing device, one or a plurality of path receivers, such as movement sensors, are arranged to a cable and thus the speed, speed variations or also the antiskid of the sheathed cable driven by the elevator drive disk are detected. In this manner acceleration versus data time can be received during the elevator safety catch process by an evaluation unit connected to the path receivers and to a timer, thereby determining the efficiency of the emergency stop device.

A disadvantage of this pre-known device is that it is not operable in certain types of elevators, e.g., indirect hydraulical elevators. Additionally, the evaluation unit is placed on the elevator where it can be damaged during the test.

SUMMARY OF THE INVENTION

The object of the invention is to improve the transducer of the above mentioned kind by designing it to be utilized independent of the special properties of the elevator, usable without an evaluation unit, and easy to handle.

The transducer is provided as a transportable measuring unit removably attached at the elevator car, comprising a sensor, a trigger component for triggering the start of recording, and with integrated buffer memory to store the data. The invention in the form of a transportable unit with an acceleration sensor is easily placed directly outside as well as inside the elevator car, or to the counterweight. By means of the integrated buffer memory, all measured values are electronically stored during the measuring process. The start of the memory recording takes place after the elevator reaches a value of acceleration, predetermined by the trigger component. In this manner, the data can be processed to produce an exact graph of deacceleration over the time during the safety catch process. The data for the time axis is generated by the respective timer. After the measuring process, the transducer is removed from the elevator car and can be connected to the evaluation unit for processing.

Once the safety catch process has been recorded, the braking deacceleration of the empty elevator car with an effective counter weight can be converted to the braking deacceleration of the elevator car loaded with a rated load during free fall.

In case the braking deacceleration was more than 1 g (which can be easily recorded), the counter weight will jump. Thus, the elevator car only acts on the emergency stop device without influencing the counter weight. Using the relation of elevator car mass without load to elevator car mass with rated load, the braking deacceleration is converted from $a_{empty}$ to $a_{rated\ load}$, where $a$ is deacceleration.

Thus, it can be seen how the elevator car loaded with the rated load would be deaccelerated in case of a catastrophe, e.g., if the support cables broke.

In this manner, the transducer can be used independent of the evaluation unit. Costly connections between both are not necessary. Additionally, if the evaluation unit remained on the elevator during the safety catch process, the forces associated with high deacceleration could destroy the evaluation unit, typically an expensive piece of equipment.

Independent of the type of elevator and the drive thereof, the transducer of the invention can be utilized in many ways. To enable a universal application of the transducer, it is advantageous if the transportable transducer unit consists of at least a sensor module containing the sensor and a memory module where the memory module is readily attachable to the sensor module. In this manner, the sensor module is exchangeable in a simple way, so that different sensors can be attached. For example, instead of a sensor for the deacceleration values, a sensor for measuring forces during the movement of the elevator can be connected. The connection between the sensor module and the memory module is formed as a direct plug-in connection.

One embodiment of the invention consists of a measuring amplifier attached to the sensor, all contained in the sensor module. This component makes amplification of the measuring signals unnecessary and the signals can be stored directly into the memory module or can be directly processed by an evaluation unit.

It is furthermore of advantage if the trigger component and the timer are contained in the memory module. This results in a transducer which is easily handled. That is, external triggers and timers are unnecessary. The internal timer may, e.g., consist of an integrated quartz timer.

To convert the analog signals of the sensors into digital signals, an A/D converter is preferably housed in the memory module and connected to the measuring amplifier. In this manner, the memory module may be utilized in many ways by connecting it to a different analog signal emitter.

To start and stop the beginning of the recording at any desired values, it is preferable if the trigger component has a variable threshold trigger value. It is also advantageous if a threshold dip switch is associated to the threshold trigger for the threshold value adjustment. By means of the dip switch, a simple adjustment of the trigger value is possible, thereby making the threshold values selectable on a wide scale.

To prevent an accidental adjustment of the threshold value, e.g., when the memory module is installed in the elevator car, it is furthermore of advantage if the threshold dip switches are arranged in the memory module in a manner that they can be adjusted from the outside via openings in the housing from the outside.

An external trigger module annulling the internal threshold trigger may be connected to the memory module via a trigger interface. By doing so, the internal threshold triggering is turned off and the recording is initiated from the outside. Radio modules, infrared modules, time modules or switch modules are a few examples of external trigger modules that can be used. They can be turned on via the respective external signals and can trigger the measuring operation.

It is also advantageous if the trigger module is connected with a plurality of transducers. In this manner, a plurality of transducers may be coupled via the trigger interface, thereby enabling a multi-channel recording. An example of multi-channel recording is the measuring of accelerations in all three spatial directions.

In another embodiment, the timer is equipped with a variable time base. By changing the time base, there is a possibility to not only record very fast operations but also normal operations of an elevator. By varying the recording periods of time, it is possible to use seconds as well as days with a recording time range from 10,000 measurements per second up to 30 measurements per minute.

Time dip switches can be connected to the timer for varying the time base. Thus, a simple adjustment of the time base is provided, wherein at the same time, the position of the dip switch may be utilized as a display for the adjusted time base. These dip switches are also disposed in the memory module and, like the threshold switches, are accessible outside the module.

To be able to connect the memory module in a simple manner to a plurality of evaluation units, it is advantageous if the interface component is disposed in the memory module and consists of a standard manufactured interface, for example, an RS-232 or centronic interface connector. In this manner, downloading the memory is facilitated and at the same time, the evaluation unit can be almost any computer which has been adapted with a compatible standard interface.

By programming the evaluation unit, it is also possible to utilize the evaluation unit for pre-adjustment of threshold trigger and/or time base, as well as to connect it to the memory module for reading the stored measured values via the interface component. In this case, the respective dip switches are disabled and the adjustment of threshold value and time base is performed directly by the evaluation unit. The evaluation unit can be utilized to read the recorded values and to further process them. Thus, a graph of the measured values is possible. After making the graph on the video screen, or generating a print-out of the graph, average values can be calculated. On the basis of these calculated values, the efficiency of the emergency stop device can then be determined.

To make the memory module independent of external voltage sources, it is also advantageous to install a module voltage supplier inside the memory module with an associated switch accessible from the outside of the memory module. The voltage supply, for example, can be in the form of a rechargeable battery. The modules connected to the memory module can also be connected to the module voltage supply. The sensor module and the trigger module, respectively, are thereby supplied via the respective connections of the modules.

In order to cancel stored values of the transducer or other variable values programmed by the evaluation unit, like the time base or the threshold value, the switch of the voltage supply can function as a reset switch.

It is furthermore of advantage, if a microprocessor is provided for controlling the transduction and for the storage in the memory module.

By separating the sensor module and memory module, it is possible to not only detect acceleration values but also any other measured values by attaching different sensors. The utilization of the transducer is of course not limited to elevators but can also be used in vehicles or other moved or fixed items. The universal memory module may also be connected to temperature modules, illumination strength modules, gas sensor modules or radiation modules.

The invention and advantageous embodiments thereof are now described with the aid of the drawings.

DETAILED DESCRIPTION

Figure 1:
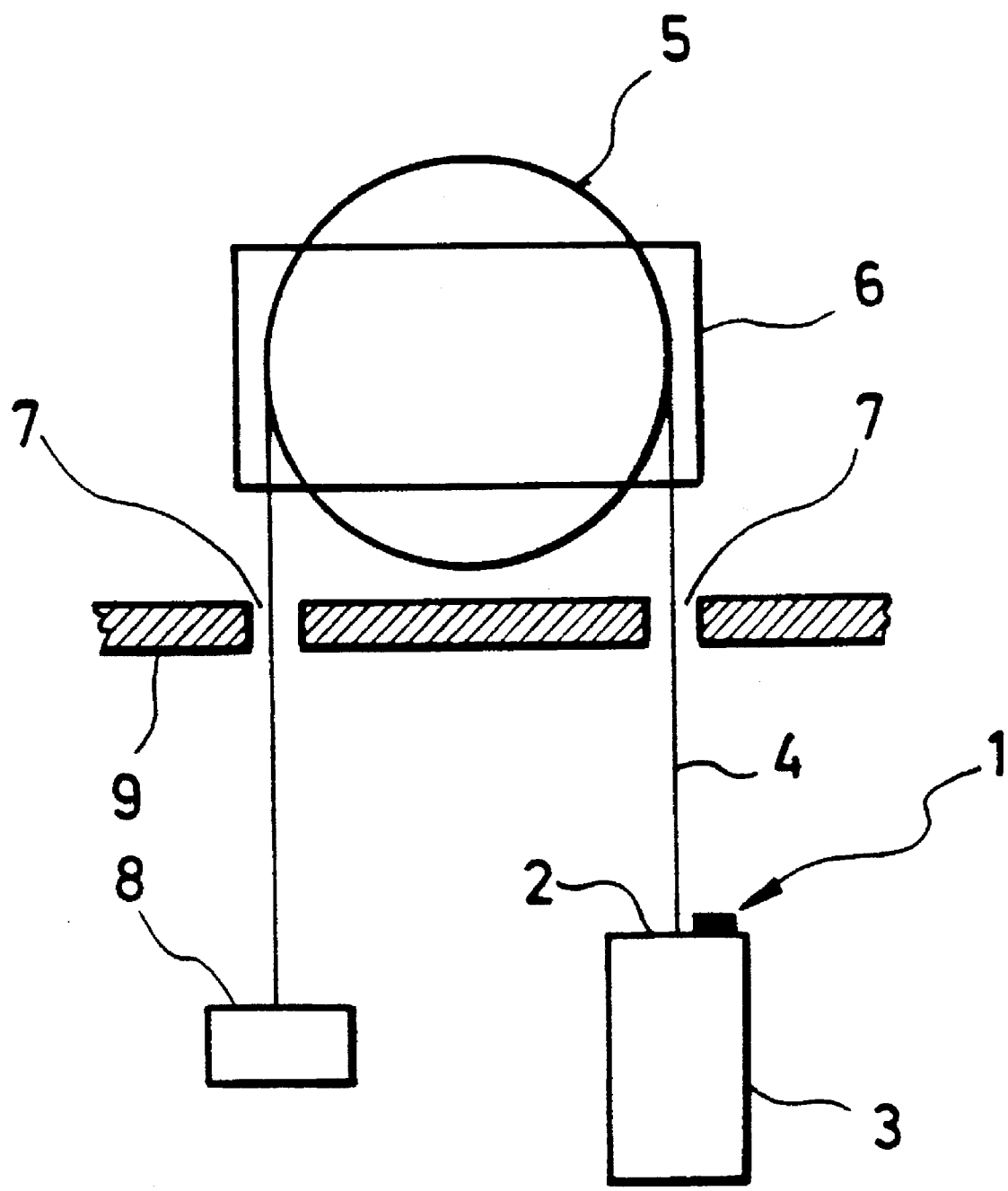
FIG. 1 shows a passenger or freight elevator.

In FIG. 1 a transducer 1 is shown on an upper surface 2 of an elevator car 3. The elevator car 3 is connected to a counter weight 8 via a cable 4. The cable 4 is arranged approximately at the same level as the elevator car. A motor transmission-braking unit 6 drives, by means of a driving disk 5, the cable 4 either in direction of the elevator car 3 or the counter weight 8. The motor transmission-braking unit 6 is separated from the elevator car by a cover 9. Apertures 7 for passing the cable 4 are provided in the cover 9.

Figure 2:
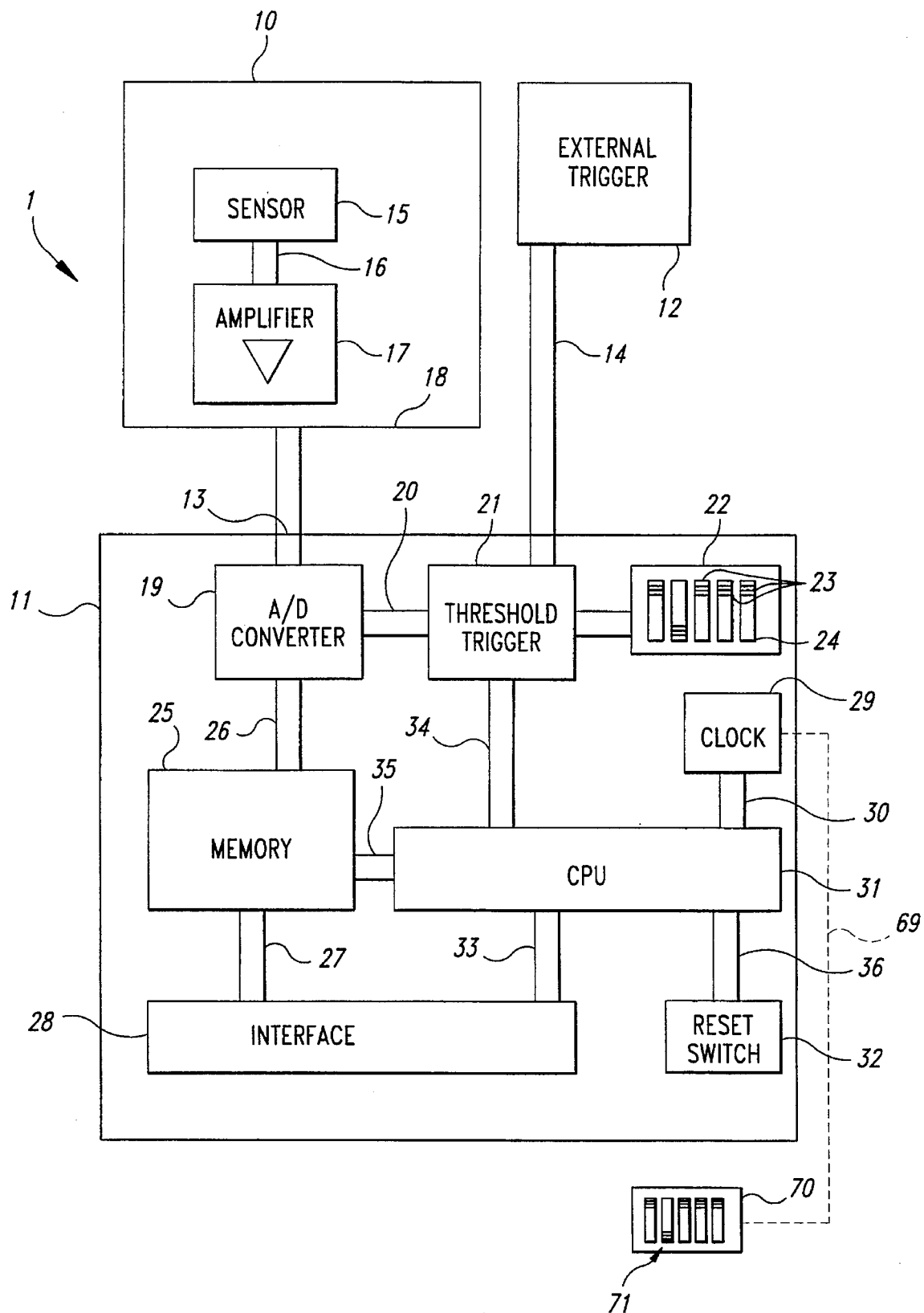
FIG. 2 shows the sensor module connected to the memory module.

In FIG. 2, the transducer 1 is shown in logical symbol component groups. In the depicted embodiment, the transducer 1 comprises three modules 10, 11 and 12. The module 10 is designed as a housing for a sensor 15, which could be, for example, an acceleration sensor. Also within the sensor module 10 is a measuring amplifier 17 via connection line 16. The sensor module 10 is connectable to the memory module 11 by means of a plug 13.

The plug 13 is connected to an A/D converter 19 in the memory module 11. The measured values received and processed by the A/D converter 19 are transferable to a memory component 25 via a connection 26. This memory component is adapted in a manner that data can be read out and written in.

The A/D converter 19 is connected to a threshold trigger 21 via another connection line 20. The respective threshold value, which initiates recording of data, is adjustable by the threshold value switch 22. The threshold value switch 22 comprises a number of dip switches 23, adjustable along guides 24. An external trigger module 12 is connectable to the threshold trigger 21 via a trigger interface 14. When this module is connected, the threshold trigger 21 is ineffective. The recording is then initiated by the external trigger module 12.

An external trigger module 12 can be connected to one or more memory modules 11 to simultaneously start one or more memory modules 11.

The threshold trigger 21 is additionally connected to a central processing unit 31 via a connection 34. The central processing unit 31 has an address decoder and may write and read data into and out of the components connected thereto. The central processing unit. 31 is connected to the memory component 25 via a connection 35 and connected to a time base 29 via a connection 30, to a reset switch 32 via a connection 36, and to an interface component 28 via a connection 27. By means of the connection 33, the central processing unit 31 also controls the data flow of measured values through the interface component 28 from the connection the memory component 25 via connection 27.

The time base 29 clocks the central processing unit 31 via the connection 30 as well as the components connected thereto and thereby determines the read rate of the measured data provided by the sensor 15. A time base standard 70 is connected to time base 29 via a connection 69. This time base standard 70 also comprises a number of dip switches 71 similar to the threshold value switch 22. The position of the dip switches 71 determines the read rate of the time base 29.

Figure 3:
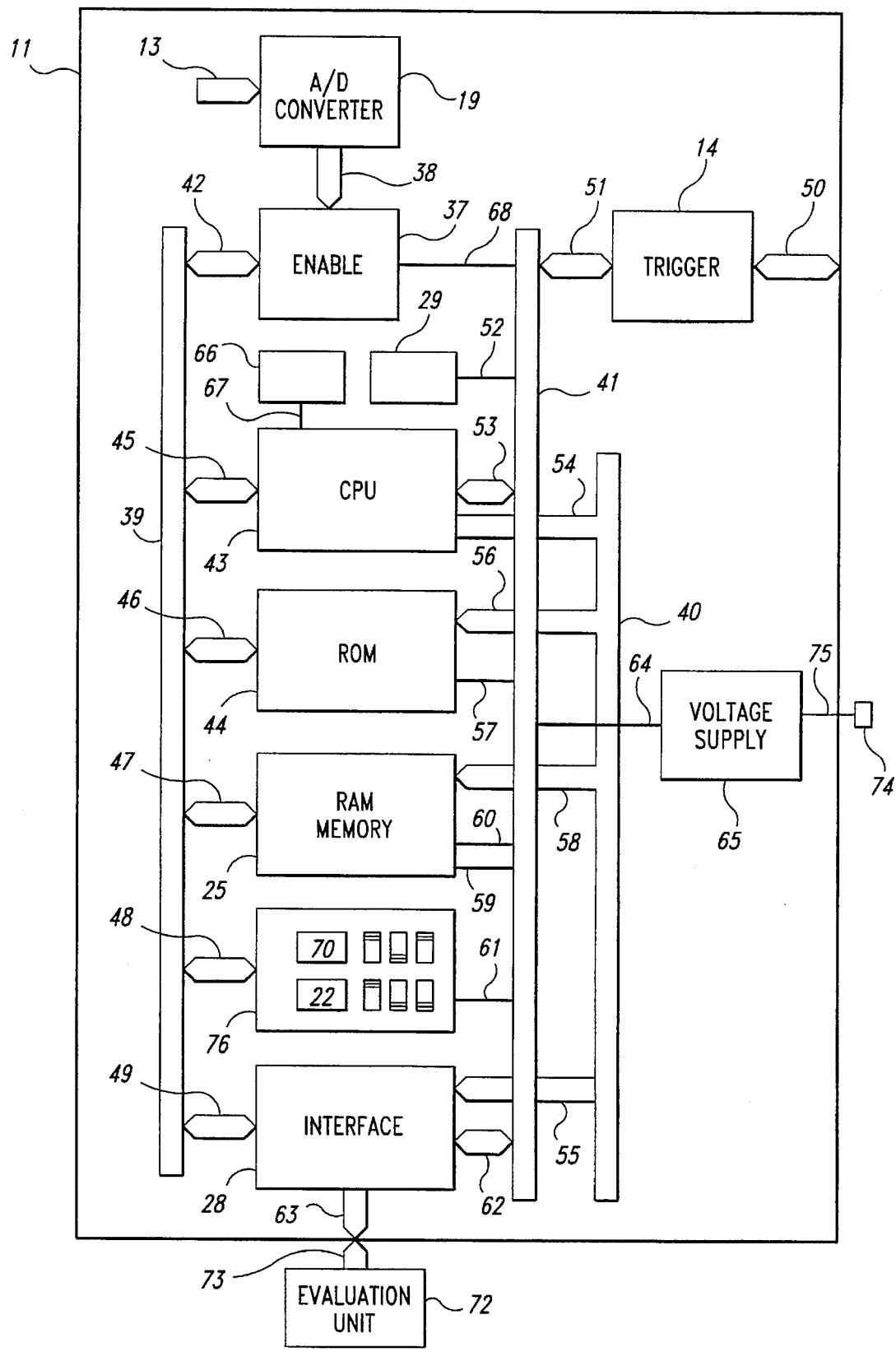
FIG. 3 shows an embodiment of the memory module.

An embodiment of the memory module 11 is shown in FIG. 3.

The components are shown as logical symbol component groups and are arranged in the memory module in a column-like fashion. As shown in FIG. 3, there is a series of connections to busses extending along the shorter edges of the components. The plug 13 is connected to the A/D converter 19 for converting the analog signals into digital signals. An enable component 37 is arranged between the A/D converter 19 and the data bus 39, connected via lines 38 to the A/D converter 19 and the line 42 is connected to the data bus 39. Only when enabled by the enable component 37 are the measured values transmitted via the data bus 39. The enable component 37 is connected to a control bus 41 via a connection line 68 in order to trigger the enable component 37.

The measured values may be transferred to the random access memory component 25 by means of the data bus 39, which may, for example, consist of an 8 bit width data bus. The data bus 39 and the random access memory 25 are connected by the connection line 47. The random access memory 25 allows data to be written in and read out therefrom.

The writing and reading of data is controllable by a microprocessor 43. It is connected to the data bus 39 via a connection 45 and connected to a control bus 41 and address bus 40 via connections 53 and 54, respectively. To determine the clocking speed at which the microprocessor 43 fulfills instructions, it is connected to the pulse emitter 66 via a further connection 67.

A read only memory (ROM) component 44 is arranged between the microprocessor 43 and the random access memory 25. In the read only memory 44, the program for the microprocessor is stored. By means of a selector line 57, the read only memory 44 is connected to the control bus 41. Additionally terminals 56 and 46 to the address bus 40 and to the data bus 39, respectively, are provided for accessing the programs stored in the read only memory 44.

A respective selector line 60 is also formed between the random access memory 25 and the control bus 41. Additionally, a writing/reading line 59, arranged parallel to the selector line 60, is connected between the random access memory 25 and the control bus 41. In order to address the random access memory 25 by means of the microprocessor 43, an addressing connection 58 is arranged between the address bus 40 and the random access memory 25. In order to be able to address the random access memory 25 by means of the microprocessor 43, an addressing connection 58 is arranged between the address bus 40 and the random access memory 25.

In FIG. 3, the adjustment unit 76 can be seen directly underneath the random access memory 25. This adjustment unit 76 comprises the variable threshold value switch 22 as well as the variable time base standard 70 similar to that shown in FIG. 2. For the connection to the data bus 39 and the control bus 41, respectively, the threshold standard 21, 22 is connected to the data bus 39 and the control bus 41 by connections 48 and selector line 61, respectively.

An interface component 28 can be seen at the lower end of FIG. 2 and FIG. 3. The interface component 28 is for communicating with auxiliary units which can control the input and the output of data. For this purpose, the interface component 28 is connected to all busses via lines 49, 55 and 62. Moreover, via the interface component 28, an evaluation unit 72 may be linked to the invention via the connection 63. The lines 63 are guided to the outer side of the sensor module 11, where they are connectable to lines 73 attached at the evaluation unit 72. The interface can be a so-called standard manufactured interface, with serial or parallel outputs for transmitting and receiving data.

In FIG. 3, the time base 29 is arranged adjacent to the pulse emitter 66. This time base 29 is connected to the control bus 41 via a pulse line 52 and is used to determine the interval of the pulse transferred to the enable component 37 before the evaluation unit 72 is connected with the time base standard 70, in which the microprocessor 43 accesses by means of the enable component 37 to the data of the A/D converter 19.

Furthermore, a trigger module interface 14 is connected to the control bus 41 via a connection line 51. The lines 50 are connected to this trigger module interface 14, fed through the periphery of the memory module 11. The lines 50 serve as the connection of the external trigger module 12 shown in FIG. 2. Via the control bus 41, the read rate output of the time base 29 can be changed via line 51 and 50.

To supply all components with the necessary voltage, a module voltage supply 65 is arranged within the memory module 11. The module voltage supply 65 is connected to the control bus 41 by means of a line 64 and supplies all components of the memory module 11 as well as the components of any externally connected modules. For switching on the module 11, the module voltage supply 65 is connected via a line 75 to a switch 74 accessible from the outer surface of the memory module 11.

It should generally be noted in FIG. 3 that all arrow-shaped converging connection lines characterize the direction of the data transfer. By these symbols it can be seen that an inquiry of the threshold value of threshold value switch 22 is only possible via the data bus 39 and the connection line 48, whereas, for example, the random access memory 25 receives data via the data bus 39 as well as output data and may be triggered by the microprocessor 43 via the connection line 58 of the address bus 40.

The cooperation of the individual components is now described as follows:

After switching on the memory module 11 by means of the switch 74, the read-in of the threshold value as well as of the read rate of the time base 29 is entered. This is performed via the interface 28 from the evaluation unit 72 connected thereto. In case no values are read in for the threshold value and for the read rate, that is, if the evaluation unit 72 is not connected, the values can be adjusted by the respective dip switch means 22 and 70.

Once a sensor module 10 is connected to the plug 13, the microprocessor 43 reads the A/D converter 19.

If an external trigger module is active, i.e., connected to the trigger module interface 14, it determines a threshold value. If not, the threshold value is read from the threshold standard 22, or the threshold values transferred by the evaluation unit 72 are used. The measuring values read by the A/D converter 19 are compared to the respective threshold standard and as soon as a measured value is in a predetermined relation (equal, smaller, higher) to the threshold value, the recording into the random access memory component 25 is started.

All data is stored in the random access memory 25, until it is full, or until an inquiry by the evaluation unit 72 via the interface 28 is initiated. If the random access memory 25 is full before a respective inquiry by the evaluation unit 72 takes place, the microprocessor 43 remains in waiting position until the necessary inquiry takes place or until the memory module 11 is switched off, If an inquiry is performed at the interface 28, the contents of the random access memory 25 are transferred to the evaluation unit 72 via the connections 63 and 73.

I claim:

1. An improved transducer apparatus for measuring and storing data associated with acceleration experienced during testing of the elevator car emergency stop mode, comprising:

a sensor for monitoring acceleration relating to the elevator during selected time intervals having a data output responsive to the value of the acceleration:

a memory device for storing said acceleration data output by said sensor;

a timer for determining the rate which said data is to be collected;

a trigger which initiates the storage of acceleration data in said memory device when a predetermined threshold value of acceleration is exceeded during testing of said elevator car emergency stop mode;

a connector for selectively attaching the transducer apparatus to an evaluation unit to process said stored data so that the evaluation unit need not be in the elevator during testing and experience the potentially destructive forces encountered during testing; and wherein said transducer apparatus is portable so that it can be placed inside of said elevator car, said trigger will commence storing of said data measured by said sensor when a predetermined threshold value is exceeded during testing of said elevator car emergency stop mode, said data can be output to said evaluation unit after testing of said elevator emergency stop device for calculation of the effectiveness of said elevator emergency stop mode operation.

2. The invention of claim 1 wherein said transducer includes a sensor module and a memory module, said sensor module containing said sensor, said memory module containing said memory device and said timer, said sensor module readily connectable to said memory module, thereby allowing variation in the type and amount of said sensor modules.

3. The invention of claim 1, further including a variable trigger for varying the predetermined threshold value which initiates storage of said data.

4. The invention of claim 3 wherein said trigger can be manually adjusted by use of a switch, said switch varying the threshold value for initiating storage of said data in said memory device.

5. The invention of claim 1 wherein said transducer has an external trigger module interface for selectively attaching an external trigger module for initiating storage of said data from one or more of said transducers simultaneously.

6. The invention of claim 1 wherein said timer is variable, thereby allowing a wide variation in the rate which said data is stored in said memory device.

7. The invention of claim 1, wherein said evaluation unit further includes means for adjusting said time interval of said timer and means for adjusting said threshold value of said trigger.

* * * * *